United States Patent [19]

Bloss et al.

[11] 3,852,098

[45] Dec. 3, 1974

[54] METHOD FOR INCREASING RATE OF COATING USING VAPORIZED REACTANTS

[75] Inventors: Karl H. Bloss, Dietzenbach-Steinberg; Harald Molketin, Frankfurt, both of Germany

[73] Assignee: PPG Industries, Inc., Pittsburgh, Pa.

[22] Filed: Dec. 15, 1972

[21] Appl. No.: 315,384

[52] U.S. Cl....... 117/106 R, 117/123 A, 117/124 A
[51] Int. Cl............................................. C23c 11/08
[58] Field of Search...... 117/106 R, 107.2 R, 107.1, 117/123 A; 260/429 J

[56] References Cited
UNITED STATES PATENTS

| | | | |
|---|---|---|---|
| 2,430,520 | 11/1947 | Marboe | 117/106 R X |
| 2,556,316 | 6/1951 | Cartledge | 260/429 J |
| 2,694,651 | 11/1954 | Pawlyk | 117/106 R |
| 2,898,227 | 8/1959 | Drummond | 117/107.2 X |
| 2,933,475 | 4/1960 | Hoover et al. | 260/429 J |
| 3,356,527 | 12/1967 | Moshier et al. | 117/107.2 R |
| 3,410,710 | 11/1968 | Mochel | 117/106 R X |
| 3,438,803 | 4/1969 | Dubble et al. | 118/48 X |
| 3,658,568 | 4/1972 | Donley | 117/106 R X |

*Primary Examiner*—Ralph S. Kendall
*Assistant Examiner*—Harris A. Pitlick
*Attorney, Agent, or Firm*—Russell A. Eberly

[57] ABSTRACT

A glass substrate is coated with a metal-containing coating by heating the glass and contacting the hot glass with a gaseous mixture. The mixture is from 50 to 100 percent saturated with the vapors of a reactive metal compound at its temperature immediately before contacting the glass. The mixture is heated by the glass to a sufficient temperature causing the metal compound to react thereby depositing the coating.

2 Claims, No Drawings

METHOD FOR INCREASING RATE OF COATING USING VAPORIZED REACTANTS

CROSS REFERENCE TO RELATED APPLICATIONS

This application is related to the following copending applications, all commonly assigned, all specifically incorporated by reference herein and all filed on even date herewith: "Nozzle for Chemical Vapor Deposition of Coatings," Ser. No. 315,394, filed Dec. 15, 1972 by Krishna Simhan; "Chemical Vapor Deposition of Coatings," Ser. No. 315,393, filed Dec. 15, 1972, by John Sopko and Krishna Simhan; and "Coating Composition Vaporizer," Ser. No. 315,395, filed Dec. 15, 1972, by John Sopko.

This application is also related to a copending application entitled "A Process for the Deposition of Films," Ser. No. 182,993, filed Sept. 23, 1971, and now abandoned based on a convention priority date of Sept. 29, 1970, by Hans-Jurgen Gotze, Helmut Lukas and Harald Molketin. This application is also incorporated by reference herein.

BACKGROUND OF THE INVENTION

This invention relates to coating substrates, particularly glass substrates, with coatings comprised primarily of metal oxides. This invention more particularly relates to contacting a hot glass surface with the vapors of reactants which form metal oxide coatings upon contacting the hot glass surface.

Prior to the present invention, it has been known that substrates may be coated with metal oxide coatings by contacting the substrates with solutions comprised of metal betadiketonates and the like dissolved in appropriate solvents. See the following U.S. Patents: Mochel, U.S. Pat. No. 3,202,054, Tompkins, U.S. Patent No. 3,081,200, Donley et al, U.S. Patent No. 3,660,061 and Michelotti et al, U.S. Patent No. 3,652,246. These patents have disclosed to the public a number of chemical compositions which are suitable for the coating of glass metal oxide coatings. In general, the techniques described for applying such coatings to glass taught in the prior art are methods wherein a liquid spray of coating composition is directed against a glass substrate surface to be coated. While these patents cover the application of particular metals or metal oxides to glass or other substrates, whether the compositions are applied in liquid or vapor form, they each disclose, as a best mode of application, contacting the substrate with the composition in liquid form. In the development of techniques for applying vaporized coating compositions to heated substrates at atmospheric pressure, certain difficulties have been encountered. It has been difficult to obtain coatings which grained and finely and uniform in appearance. Thick coatings have been produced by contacting the substrate with a liquid spray, but it has been extremely difficult, if not impossible, to obtain relatively thick films having visible light transmittances of below about 50 percent using known vapor deposition techniques.

Vapor deposition processes have been known in the past. Most commercial embodiments of vapor deposition processes are processes carried out under subatmospheric pressure conditions. In the past, the rate of deposition has been controlled or enhanced by increasing the temperature of the substrate being coated or increasing the temperature of the coating composition. Severe limitations have been encountered using such techniques. For commonly used materials, deposition rates abruptly cease to increase with increasing temperature while the coatings produced remain thin. Attempts to increase the activity of the coating generally result in premature reaction and apparently autocatalytic decomposition of the reactants with coating efficiency actually decreased.

The applicants have now discovered that the uniformity of films produced by chemical vapor deposition and the rate of chemical vapor deposition or film buildup may be significantly enhanced by vaporizing reactants into a gaseous carrier in sufficient quantity to approach saturation of the carrier and by then directing the mixture against the substrate to be coated.

SUMMARY OF THE INVENTION

A vaporizable coating reactant having an entropy of vaporization of at least about 40 Clausius is mixed with a hot carrier gas and is vaporized without substantial decomposition in the gas mixture due to its intimate contact with a hot carrier gas which then carries the vaporized coating reactant into contact with a hot substrate causing the reactant to deposit a coating on the substrate. The coating reactant is vaporized in a sufficient amount to provide a coating reactant — gaseous carrier mixture which is from about 50 to about 100 percent saturated with coating reactant. The advantages of the present invention are particularly apparent in the instanace of coating reactants which autocatalytically decompose at temperatures only slightly above their effective vaporization temperatures. When employing such reactants, they are preferably dispersed into a hot carrier gas and vaporized by the heat of the gas. By dispersing such reactants in a gaseous phase the autocatalytic effect of some isolated decomposition is virtually eliminated, and by vaporizing from a fog or smoke of reactant in gas the vaporization efficiency is sufficiently enhanced so as to be practical at lower temperatures.

As already indicated, the coating reactants useful in this invention are defined by their entropies of vaporization. As used throughout, vaporization includes both sublimation and evaporation. The significance of this criterion may be appreciated from the following discussion. Coating processes involving hydrolytic or pyrolytic reaction are topochemical in nature; that is, the coating reaction at the surface of a substrate must proceed preferentially to reactions in the vicinity of the substrate but not in sufficiently close proximity thereto for the products of reaction to adhere to the substrate and to themselves to form a coating. The heterogeneous nature of such reactions suggests that coating reactants having reactions that are catalyzed by the products of reaction are preferred for coating. The drawback to such reactants is that reactions initiated remote from a substrate to be coated can proceed rapidly out of control and, by causing massive decomposition, destroy all coating effectiveness. In order to avoid this massive decomposition, sufficient coating reactant must be vaporized at a temperature as low as possible while obtaining a high concentration of coating reactant in the gas or vapor which contacts the substrate to be coated. Localized excessive concentration of a coating reactant is believed to result in recondensation of coating reactant at low temperatures about the vaporization temperature and to result in massive autocatalyzed decomposition at high temperatures. Reactants which are characterized by high entropies of vaporization are believed to diffuse so easily into any carrier gas employed so as to avoid localized excessive concentration. Such coating reactants are found to have vapor pressures that increase sharply below their decomposition temperatures so that steep concentration gradients may be established in the vicinity of intended reaction in contact with a substrate to be coated.

The reactants to be employed in this invention may be combined with a carrier gas in large quantities without saturating it at atmospheric pressure and the temperatures employed for vaporization and delivery of the mixture into close proximity with a hot substrate. But, because the vapor pressures of these reactants rise so sharply with temperature, their activity is disproportionately high with respect to their concentration in the immediate thermal boundary layer adjacent a hot substrate to be coated. Thus, the coating deposition rate is enhanced because of the cooperation between the thermal boundary layer adjacent a hot substrate to be coated and the particular coating reactants employed.

The thermal boundary layer may be considered to be a relatively quiescent layer of gas adjacent the hot substrate to be coated in which the temperature increases asymptotically from the ambient coating chamber temperature (bulk gas temperature) of from about 200°C. to about 300°C. to the substrate surface temperature of from about 400°C. to about 600°C. The apparent thickness of such a layer is below about 1 millimeter. Coating reactants moving to the substrate through this layer and waste products moving away through it are believed to be transported primarily by diffusion as evidenced by the superior performance obtained when practicing this invention.

In the preferred practice of this invention, a carrier gas, which may be an inert gas or a highly reactive gas but which is preferably air, carries sufficient vapors of a reactive coating compound to cause the mixture to be from 85 to 100 percent saturated, and preferably from 90 to 95 percent saturated. This degree of saturation is preferred to complete 100 percent saturation because the amount of reactant is thereby controllably varied.

In a most preferred embodiment, the carrier gas is supplied at a first temperature and the coating reactant is dispersed into it under conditions such that the mixture is about 100 percent saturated upon mixing. The mixture is then conveyed away from the point of mixing and vaporization and is heated to a slightly higher temperature (5 to 10°C. higher). The mixture may then be conveyed to the substrate to be coated without danger of inadvertent condensation of reactant yet with a precisely controlled quantity of reactant being maintained in the mixture.

Using a gas saturation method, vapor pressures, equilibrium vapor temperatures and vaporization enthalpies were determined for potential coating reactants. The vaporization apparatus comprised a jacketed glass vessel thermostated by circulating hot oil. Test substances were vaporized at fixed pressure into streams of nitrogen heated to desired temperatures. Flow rates were measured. The vaporized substances were deposited on fritted absorption traps charged with solvent. Individual trapped substances were diluted with solvent to fixed volumes, and aliquot portions analyzed by conventional spectroscopic technique to determine the amount of substance transferred. Conventional calorimetric techniques yielded enthalpy information.

Conventional thermodynamic considerations yield the following relationships:

$$\log P_2 - \log P_1 = \Delta H_{evap}/R\ [\ -1/T_2 - -1/T_1\ ]$$

and $$\Delta S_{evap} = \Delta H_{evap}/T$$

where $P_1$ and $P_2$ are vapor pressures in torr at $T_1$ and $T_2$;

$T$, $T_1$ and $T_2$ are absolute temperatures in degrees Kelvin;

$R$ is the gas constant;

$\Delta H$ is the enthalpy or heat of evaporation in calories;

$\Delta S$ is the entropy of evaporation in Clausius.

From these relationships and the experimental data obtained, the coating reactants suitable for use in this invention are determined. The properties of these materials and other tested materials are summarized in Tables 1 and 2.

TABLE 1

VAPORIZATION DATA

| Substance | $T_{evat}$ | $\Delta H_{evap}$ | $\Delta S_{evat}$ | $t_{evat}$ | m.p. | $t_{evat}$—m.p. |
|---|---|---|---|---|---|---|
| | °K | kcal | Clausius | °C. | °C. | °C. = °K. |
| Fe(acac)$_2$ | 569 | 28.6 | 50.3 | 296 | 188 | 108 |
| Fe(acac)$_3$ | 582 | 26.9 | 46.3 | 309 | 190 | 119 |
| Fe(F$_3$acac)$_3$ | 473 | 31.6 | 66.8 | 200 | 120 | 80 |
| Fe(F$_6$acac)$_3$ | 522 | 15.53 | 29.8 | 249 | 55 | 195 |
| Cr(acac)$_3$ | 588 | 27.4 | 46.6 | 315 | 214 | 101 |
| Cr(F$_3$acac)$_3$ | 512 | 25.4 | 49.6 | 239 | 155 | 84 |
| Ni(acac)$_2$ | 698 | 22.9 | 32.8 | 425 | 235 | 190 |
| Co(acac)$_2$ | 643 | 19.5 | 30.3 | 370 | 180 | 190 |
| Co(F$_3$acac)$_2$ | 493 | 25.5 | 51.8 | 220 | 110 | 110 |
| Co(acac)$_3$ | 622 | 25.5 | 41.1 | 349 | 210 | 139 |
| Co(F$_3$acac)$_3$ | 523 | 26.2 | 50.1 | 250 | 160 | 90 |
| Mn(acac)$_2$ | 767 | 20.8 | 27.1 | 494 | 60(dec.) | — |
| Mn(acac)$_3$ | 582 | 26.9 | 46.2 | 309 | 172 | 137 |
| Cu(acac)$_2$ | 614 | 26.45 | 43.4 | 341 | 230(dec.) | (111) |

TABLE 2

VAPOR PRESSURES (TORR)

| Substance | 100°C. | 120°C. | 140°C. | 160°C. | 180°C. | 200°C. |
|---|---|---|---|---|---|---|
| Fe(acac)$_2$ | $1.4 \cdot 10^{-3}$ | $9.5 \cdot 10^{-3}$ | $4.9 \cdot 10^{-2}$ | $2.8 \cdot 10^{-1}$ | 1.2 | 4.5 |
| Fe(acac)$_3$ | $1.1 \cdot 10^{-3}$ | $7.2 \cdot 10^{-3}$ | $3.7 \cdot 10^{-2}$ | $1.8 \cdot 10^{-1}$ | $7.3 \cdot 10^{-1}$ | 2.8 |
| Fe(F$_3$acac)$_3$ | $1.1 \cdot 10^{-1}$ | 0.82 | 6.0 | $3.5 \cdot 10^{1}$ | $1.7 \cdot 10^{2}$ | $7.6 \cdot 10^{2}$ |

TABLE 2 – Continued

VAPOR PRESSURES (TORR)

| Substance | 100°C. | 120°C. | 140°C. | 160°C. | 180°C. | 200°C. |
|---|---|---|---|---|---|---|
| $Fe(F_6acac)_3$ | 1.9 | 5.2 | $1.4 \cdot 10^1$ | $3.4 \cdot 10^1$ | $7.5 \cdot 10^1$ | $1.6 \cdot 10^2$ |
| $Cr(acac)_3$ | $1.1 \cdot 10^{-3}$ | $7.0 \cdot 10^{-3}$ | $3.9 \cdot 10^{-2}$ | $1.8 \cdot 10^{-1}$ | $7.0 \cdot 10^{-1}$ | 2.6 |
| $Cr(F_3acac)_3$ | $5.8 \cdot 10^{-2}$ | $3.4 \cdot 10^{-1}$ | 1.8 | 7.4 | $2.7 \cdot 10^1$ | $9.5 \cdot 10^{-1}$ |
| $Ni(acac)_2$ | $4.8 \cdot 10^{-4}$ | $2.3 \cdot 10^{-3}$ | $9.5 \cdot 10^{-3}$ | $8.0 \cdot 10^{-2}$ | $1.1 \cdot 10^{-1}$ | $3.2 \cdot 10^{-1}$ |
| $Co(acac)_2$ | $1.2 \cdot 10^{-2}$ | $4.6 \cdot 10^{-2}$ | $1.6 \cdot 10^{-1}$ | $4.6 \cdot 10^{-1}$ | 1.2 | 3.1 |
| $Co(F_3acac)_2$ | $1.6 \cdot 10^{-1}$ | $9.6 \cdot 10^{-1}$ | 4.6 | $1.95 \cdot 10^1$ | $7.10^1$ | $2.6 \cdot 10^2$ |
| $Co(acac)_3$ | $8.7 \cdot 10^{-4}$ | $4.8 \cdot 10^{-3}$ | $2.4 \cdot 10^{-2}$ | $1.0 \cdot 10^{-1}$ | $3.5 \cdot 10^{-1}$ | 1.2 |
| $Co(F_3acac)_3$ | $3.4 \cdot 10^{-2}$ | $1.9 \cdot 10^{-1}$ | $9.5 \cdot 10^{-1}$ | 4.3 | $1.5 \cdot 10^1$ | $5.3 \cdot 10^1$ |

The entropies of vaporization presented in Table 1 range from less than 30 to almost 70 Clausius. Since the materials of Table 1 are solids at room temperature, these may be characterized more specifically as entropies of sublimation. It will be noted that these entropies are all well above the 22 to 25 Clausius span which embraces non-associating, nondissociating substances. From this evidence, one might conclude that the average degree of association for these compounds ranges from 1.2 to 3 in the solid state if their vapors are unimolecular. Of particular interest in the Table are the entropies for the triacetylacetonates of chromium, manganese and iron, which are almost coincident. Therefore, as will be seen later, composite coatings may be produced from these reactants in approximate proportion to their proportions in a feed stream.

From Table 1, it may also be noted that the vaporization points exceed the melting points of the triacetylacetonates by roughly equivalent spans, all less than 140°C. Since the solid complexes are thermostable enough to permit their melting points to be recorded, the vaporization-melting point span represents the approximate range in which the thermolabile liquid particles burst into the less heat-sensitive vapor. This range may be considered a range of thermal jeopardy, that is, it is in this temperature range in which the materials have sufficient heat and are sufficiently compact that their autocatalytic decomposition is greatly risked before they may be widely dispersed in a vapor phase.

The bis-acetylacetonates of manganese, nickel and cobalt are noted to have distinctly smaller entropies of vaporization and to have considerably greater spans of melting point temperature to vaporization point temperature, so that fusion rather than flash vaporization is likely with such materials. The iron II-acetylacetonate, however, with an entropy of vaporization of 50.3 Clausius and with a thermal jeopardy span of 108°C. resembles the triacetylacetonates, and so an iron II-acetylacetonate anomaly is observed.

The following conclusions are based on the thermodynamic data presented in Tables 1 and 2. Iron II-acetylacetonate is, from the viewpoint of vaporization behavior, slightly better suited for chemical vapor deposition than iron III-acetylacetonate. It has both a lower vaporization temperature and a higher entropy of vaporization than does iron III-acetylacetonate. In contrast, cobalt III-acetylactonates are preferred to cobalt II-acetylacetonates.

The fusion of materials is detrimental to vapor coating because, once fused, the materials remain in a close mass, while their temperature increases, and may decompose rather than vaporize from a sticky, fused mass. In contrast, powders which have a narrow melting point or fusion point to vaporization point span may be dispersed as powders into a hot stream of gas and have their temperature quickly raised to the vaporization temperature, with possibly some fusion occurring but without massive agglomeration of particles into a fused mass that has its temperature increased to a decomposition point and without substantial vaporization.

Mixed oxide coatings are preferably prepared from materials having their vaporization parameters (entropy of vaporization and thermal jeopardy span) closely related to one another. For example, the triacetylacetonates of chromium, manganese, iron and cobalt all have entropies of vaporization which are 46 ± 5 Clausius, and all have thermal jeopardy spans which are 120 ± 20 C. By the same token, nickel and cobalt acetylacetonates are favored for combinations.

Trifluoroacetylacetonates show quite advantageous characteristics for chemical vapor deposition. The span between melting point and vaporization point is quite small, being only 80°C., and the entropy of vaporization, e.g., of iron-III trifluoroacetylacetonate is 66.8 Clausius, which is almost 50 percent greater than the entropy of vaporization for the fluorine-free iron III-acetylacetonate. The iron III-trifluoroacetylacetonate powder can be vaporized efficiently in a powder vaporizer, and its partial pressure is increased to atmospheric pressure before any pyrolysis of individual particles is detected.

While the discussion above points out the importance of vaporization entropy of coating reactants as affecting the usefulness of particular compounds for chemical vapor deposition, the significance of carrier gas saturation is more particularly pointed out in the following examples. In the following examples, soda-lime-silica glass plates are coated by pyrolysis of the coating reactants tested. In all examples, glass plates are clamped to a heated traversing mechanism disposed within a coating chamber and passed beneath a slot through which a gaseous mixture containing vapors of coating reactant is passed and directed against the glass plates. In all instances, the exposed plates have exposed areas for coating, measuring 24 square inches. The coating reactants are powdered and fed into a heated tubular chamber leading to the slot facing the glass specimen. A carrier gas is heated and directed into the tubular chamber to carry the coating reactant and vaporize it as it passes through the chamber to the slot for discharge against the specimen to be coated. The amount of coating reactant delivered to the chamber, the flow rate of carrier gas, the duration of deposition, the temperature of the carrier gas in the tubular chamber and the temperature of the glass specimen are all measured during coating. After each specimen is coated, the coating is chemically stripped from the specimen and the quantity of metal in the coating is determined by conventional atomic absorption analysis. The total supply of metal provided is known, and the size of the slot in relation to the glass specimen is such that blowby material may be ignored.

EXAMPLE I

Using a slot having a width of 3 millimeters and a length of 5 millimeters, carrier gas is supplied at a rate of 7.6 liters per minute and the source temperature is adjusted to establish a constant vapor pressure of $5.7 \times 10^{-3}$ torr when powdered iron II-acetylacetonate was supplied by a screw feeder to a pipe surrounded by a resistance heater. This heated pipe is connected to the slot. The substrate temperature is varied for each series of specimens by controlling the temperature of a hot plate supporting it in order to establish the effect of substrate temperature upon deposition rate. In a first series, the substrate temperature is 300°C., and in each succeeding series the substrate temperature is raised by 20°C. Analysis of the resulting coated specimens shows that deposition rate, as represented by micrograms of metal per square centimeter, is substantially independent of glass temperature above about 400°C. This demonstrates that the substrate temperature, which has been known in the past to be important to deposition rate, is not a limiting factor in chemical vapor deposition. The coating reactant employed must have greater activity due to greater effective concentration near the substrate surface in order to cause greater reaction rates, for the evidence shows that this is a more important limiting factor. The full results of this example are presented in Table 3 below.

EXAMPLE II

The procedure of Example I is repeated, except that iron III-acetylacetonate is employed at a vapor pressure of $2.9 \times 10^{-3}$ torr. Again, the substrate temperature is found not to be a limiting factor in coating rate. The full results of this example are also presented in Table 3.

EXAMPLE III

The procedure of Example I is again repeated, except that nickel II-acetylacetonate is employed at a vapor pressure of $3.4 \times 10^{-3}$ torr in this example, and again, temperature is not found to be limiting above about 450°C. The full results of this example are also presented in Table 3.

TABLE 3

| Glass Temperature °C. | Deposition Rate Micrograms/Centimeter[2] | | |
|---|---|---|---|
| | Fe(acac)$_2$ | Fe(acac)$_3$ | Ni(acac)$_2$ |
| 300 | 2.5 | 1.95 | 0.25 |
| 320 | 2.65 | 2.1 | 0.25 |
| 340 | 2.9 | 2.3 | 0.25 |
| 360 | 3.1 | 2.45 | 0.25 |
| 380 | 3.3 | 2.6 | 0.3 |
| 400 | 3.4 | 2.7 | 0.55 |
| 420 | 3.4 | 2.7 | 0.65 |
| 440 | 3.4 | 2.7 | 0.9 |
| 460 | 3.4 | 2.7 | 0.95 |
| 480 | 3.4 | 2.7 | 1.0 |
| 500 | 3.4 | 2.7 | 1.0 |
| 520 | 3.4 | 2.7 | 1.0 |
| 540 | 3.4 | 2.7 | 1.0 |
| 560 | 3.4 | 2.7 | 1.0 |

The procedures described in Examples I, II and III were repeated, using cobalt II-acetylacetonate, cobalt III-acetylacetonate, iron III-trifluoroacetylacetonate and chromium III-acetylacetonate. The temperature independence phenomena is noted for the cobalt compounds; however, as noted before, the fluorine-containing compounds and chromium compound exhibit so much greater entropy than do the other compounds that within the constraints of the test these materials could not be run to limitation.

EXAMPLE IV

Iron III-acetylacetonate is used to deposit iron oxide coatings on a series of specimens in order to demonstrate the significance of carrier gas saturation upon deposition rate. The coating reactant is vaporized from a powder at 116°C., and the carrier gas is supplied at two different rates; namely, 7.6 liters per minute and 21.8 liters per minute. If the degree of saturation were not a factor, the performance of the process using the higher gas supply rate should be substantially greater than using the slower gas supply rate. However, in this example, the slower gas flows are found to provide substantially higher vapor concentration in the mixture, and the greater yields obtained under these conditions demonstrate the significance of the degree of vapor saturation in the carrier gas mixture. As will be seen in the Table below, which summarizes the results of this experiment, the glass is moved relative to the gas mixture discharge slot at different speeds and temperatures are also varied under the most favorable concentration conditions. The following Table 4 summarizes the results of this example.

TABLE 4

IRON III-ACETYLACETONATE: DEPOSITION RATES AND YIELDS

| Carrier Gas Supply Rate l.min.$^{-1}$ | Vapor Pressure 10$^{-3}$ torr | Number of Sweeps | Glass Speed cm.min.$^{-1}$ | Deposit Microgram cm.$^2$ | Deposition Rate microgram/cm.min. | Yield % | Temperature °C. |
|---|---|---|---|---|---|---|---|
| 7.6 | 4.3 | 1 | 5.2 | 1.47 | 7.65 | 60.7 | 425 |
| 7.6 | 4.3 | 1 | 5.2 | 1.31 | 6.82 | 54.1 | 425 |
| 7.6 | 4.3 | 1 | 2.7 | 1.63 | 4.40 | 34.9 | 425 |
| 7.6 | 4.3 | 1 | 2.7 | 2.24 | 6.05 | 47.9 | 425 |
| 7.6 | 4.3 | 1 | 1.0 | 3.22 | 3.22 | 25.6 | 425 |
| 7.6 | 4.3 | 1 | 1.0 | 3.78 | 3.78 | 30.0 | 425 |
| 7.6 | 4.3 | 1 | 0.5 | 6.73 | 3.37 | 26.7 | 425 |
| 7.6 | 4.3 | 1 | 0.5 | 6.45 | 3.23 | 25.6 | 425 |
| 7.6 | 4.3 | 1 | 0.2 | 18.6 | 3.72 | 29.5 | 425 |
| 7.6 | 4.3 | 1 | 0.2 | 18.7 | 3.74 | 29.7 | 425 |
| 21.8 | 4.3 | 1 | 5 | 2.08 | 10.4 | 28.9 | 415–420 |
| 21.8 | 4.3 | 1 | 5 | 2.39 | 11.95 | 33.2 | 415–420 |
| 21.8 | 4.3 | 1 | 2.7 | 5.3 | 14.31 | 39.6 | 415–420 |
| 21.8 | 4.3 | 1 | 2.7 | 3.7 | 9.98 | 27.6 | 415–420 |
| 21.8 | 4.3 | 1 | 1.0 | 6.73 | 6.73 | 18.6 | 415–420 |
| 21.8 | 4.3 | 1 | 1.0 | 7.01 | 7.01 | 19.4 | 415–420 |
| 21.8 | 4.3 | 1 | 0.5 | 14.1 | 7.05 | 19.5 | 415–420 |
| 21.8 | 4.3 | 1 | 0.5 | 14.3 | 7.15 | 19.8 | 415–420 |
| 21.8 | 4.3 | 1 | 0.2 | 36.9 | 7.38 | 20.4 | 415–420 |
| 21.8 | 4.3 | 1 | 0.2 | 32.0 | 6.4 | 17.7 | 415–420 |

EXAMPLE V

Using the favored conditions of Example IV, iron III-trifluoroacetylacetonate is used to deposit coatings. The results are summarized in Table 5.

TABLE 5

IRON III-TRIFLUOROACETYLACETONATE DEPOSITION

| Carrier Gas Supply Rate | Vapor Pressure | Number of Sweeps | Glass Speed | Deposit Microgram | Deposition Rate | Yield | Temperature |
|---|---|---|---|---|---|---|---|
| $l.min.^{-1}$ | $10^{-3}$ torr | | $cm.min.^{-1}$ | $cm.^2$ | microgram/cm.min. | % | °C. |
| 7.6 | 150 | 1 | 5 | 17.4 | 87.0 | 19.1 | 462 |
| 7.6 | 150 | 1 | 5 | 17.1 | 85.5 | 18.8 | 462 |
| 7.6 | 150 | 1 | 10 | 7.95 | 79.5 | 17.5 | 462 |
| 7.6 | 150 | 1 | 10 | 8.45 | 84.5 | 18.6 | 462 |
| 7.6 | 150 | 1 | 20 | 5.18 | 103.6 | 22.8 | 462 |
| 7.6 | 150 | 1 | 20 | 5.10 | 102.0 | 22.4 | 262 |
| 7.6 | 150 | 1 | 42 | 4.81 | 202.0 | 44.6 | 462 |

The principles of this invention may be applied to the vapor coating of substances which are vaporized from the solid state or which are first dissolved in an appropriate solvent and then vaporized. In the instance where the reactants are first dissolved in a solvent, the entropy of vaporization and the degree of saturation of the carrier gas are of great significance, just as they are when the coating reactant is vaporized from the solid state. This is because these factors are responsible for the sharp and sufficient increase in activity of the coating reactant immediately adjacent a hot substrate to be coated, so that the coating is rapidly deposited, while in a region close to the substrate to be coated but outside the thermal barrier, the conditions of the vapor-gas carrier mixture are such that premature pyrolysis or decomposition will not occur. When a coating reactant is vaporized from its solid state, particularly when vaporizing it without first dissolving it in a solvent, the span of thermal jeopardy should preferably be less than about 140°C., and more preferably less than 120°C. This factor has particular importance when using a powder vaporizer, for example, because materials which satisfy this constraint may be vaporized without substantial agglomeration of fused reactant, which then heats without breaking up and may prematurely decompose or pyrolyze before being fully vaporized, which decomposition would be massive due to the autocatalytic effect already observed.

Since the principles described herein provide a satisfactory rationale for defining other materials which could be suitably employed in the practice of this invention, it is clear that the present invention is not limited to the particular materials explicitly described herein. Accordingly, the present invention is construed to be limited only by the appended claims.

We claim:
1. A method of coating a glass substrate with a metal oxide coating comprising the steps of:
   a. dispersing a powdered coating reactant having a standard vaporization entropy of at least 40 Clausius and a melting point-to-vaporization point span of less than about 120°C. into a stream of air that is sufficiently hot to vaporize the coating reactant so that a mixture of air and vaporized coating reactant is formed;
   b. maintaining the mixture at a temperature above that at which it is saturated with the coating reactant and below that at which the coating reactant pyrolyzes;
   c. heating the glass substrate to a temperature sufficient to cause the coating reactant to pyrolyze; and
   d. delivering the mixture sufficiently closely to the hot glass substrate to cause the coating reactant to pyrolyze forming a coating on the substrate.
2. The method according to claim 1 wherein the coating reactant is a metal trifluoroacetylacetonate.

* * * * *